US011122247B2

(12) United States Patent
Lee (10) Patent No.: US 11,122,247 B2
(45) Date of Patent: *Sep. 14, 2021

(54) DEPTH MAP GENERATION DEVICE CAPABLE OF CORRECTING OCCLUSION

(71) Applicant: eYs3D Microelectronics, Co., Taipei (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,468

(22) Filed: Mar. 27, 2018

(65) Prior Publication Data

US 2018/0302606 A1 Oct. 18, 2018

Related U.S. Application Data

(60) Provisional application No. 62/549,967, filed on Aug. 25, 2017, provisional application No. 62/479,331, filed on Mar. 31, 2017.

(51) Int. Cl.
*G06T 7/00* (2017.01)
*G06T 7/593* (2017.01)
(Continued)

(52) U.S. Cl.
CPC ........... *H04N 13/128* (2018.05); *G06T 5/005* (2013.01); *G06T 5/50* (2013.01); *G06T 7/521* (2017.01);
(Continued)

(58) Field of Classification Search
CPC ............... H04N 13/128; H04N 13/243; H04N 2013/0081; H04N 13/271; H04N 13/161; H04N 19/597; H04N 19/136; H04N 19/625; H04N 19/85; H04N 13/111; H04N 13/106; H04N 17/002; H04N 5/247; H04N 13/232; H04N 2013/0088; H04N 9/097;
(Continued)

(56) References Cited

U.S. PATENT DOCUMENTS 8,331,654 B2 * 12/2012 Abraham ................ G06T 7/285
382/154
8,619,082 B1 * 12/2013 Ciurea .................. H04N 13/232
345/427
(Continued)

FOREIGN PATENT DOCUMENTS

CN 102077244 A 5/2011
CN 102572465 A 7/2012
(Continued)

*Primary Examiner* — Alison Slater
(74) *Attorney, Agent, or Firm* — Winston Hsu (57) ABSTRACT

A depth map generation device capable of correcting occlusion includes at least two image capture pairs and a depth map generator. The at least two image capture pairs is used for capturing a plurality of images. The depth map generator is coupled to the two image capture pairs for generating a first depth map and a second depth map according to the plurality of images, wherein when the first depth map includes a first occlusion region and a first non-occlusion region, the depth map generator corrects the first occlusion region according to the second depth map.

15 Claims, 7 Drawing Sheets

(51) Int. Cl.
*G06T 5/00* (2006.01)
*G06T 7/11* (2017.01)
*G06T 7/174* (2017.01)
*G06T 7/521* (2017.01)
*H04N 13/128* (2018.01)
*H04N 13/271* (2018.01)
*H04N 5/225* (2006.01)
*G06T 7/80* (2017.01)
*H04N 5/222* (2006.01)
*G06T 5/50* (2006.01)
*H04N 13/296* (2018.01)
*H04N 13/239* (2018.01)
*H04N 13/254* (2018.01)
*H04N 13/00* (2018.01)

(52) U.S. Cl.
CPC ............... *G06T 7/593* (2017.01); *G06T 7/85* (2017.01); *H04N 5/2228* (2013.01); *H04N 5/2256* (2013.01); *H04N 13/239* (2018.05); *H04N 13/254* (2018.05); *H04N 13/271* (2018.05); *H04N 13/296* (2018.05); *G06T 2207/10012* (2013.01); *G06T 2207/10028* (2013.01); *G06T 2207/20212* (2013.01); *G06T 2207/20221* (2013.01); *H04N 2013/0081* (2013.01); *H04N 2013/0096* (2013.01)

(58) Field of Classification Search
CPC .... H04N 13/254; H04N 13/239; G06T 7/593; G06T 7/85; G06T 2207/10012; G06T 2207/10052; G06T 7/557; G06T 2207/10016; G06T 2207/30196; G06T 2207/10024; G06T 15/20; G06T 7/521; G06T 2207/10028; G06T 7/80; G06T 5/005; G06T 5/50; G06T 2207/20221; G06T 7/596

See application file for complete search history.

(56) References Cited

U.S. PATENT DOCUMENTS

| | | | |
|---|---|---|---|
| 8,817,069 B2* | 8/2014 | Alessandrini | G06T 5/005 348/42 |
| 9,430,834 B2* | 8/2016 | Le | G06T 7/32 |
| 9,674,504 B1* | 6/2017 | Salvagnini | G06K 9/4604 |
| 10,165,248 B2* | 12/2018 | Hung | H04N 13/239 |
| 10,482,618 B2* | 11/2019 | Jain | G06T 7/13 |
| 2008/0123937 A1* | 5/2008 | Arias Estrada | G06T 7/593 382/154 |
| 2009/0244090 A1* | 10/2009 | Zhang | G06K 9/2036 345/619 |
| 2010/0303340 A1* | 12/2010 | Abraham | G06T 7/285 382/154 |
| 2011/0080464 A1* | 4/2011 | Alessandrini | G06T 5/005 348/42 |
| 2014/0321712 A1* | 10/2014 | Ciurea | H04N 13/232 382/106 |
| 2015/0009277 A1* | 1/2015 | Kuster | G06T 5/50 348/14.07 |
| 2015/0170370 A1* | 6/2015 | Ukil | G09G 5/377 382/154 |
| 2015/0248745 A1* | 9/2015 | Chen | G06T 7/593 382/154 |
| 2016/0309134 A1* | 10/2016 | Venkataraman | G02B 27/017 |
| 2017/0180706 A1* | 6/2017 | Salvagnini | H04N 13/254 |
| 2018/0115763 A1* | 4/2018 | Hung | H04N 13/239 |
| 2018/0204340 A1* | 7/2018 | Zhao | H04N 13/20 |
| 2018/0205926 A1* | 7/2018 | Mogalapalli | G06T 5/005 |

FOREIGN PATENT DOCUMENTS

| | | |
|---|---|---|
| CN | 105809667 A | 7/2016 |
| TW | 201327474 A1 | 7/2013 |
| TW | I567693 B | 1/2017 |

* cited by examiner

DEPTH MAP GENERATION DEVICE CAPABLE OF CORRECTING OCCLUSION

CROSS REFERENCE TO RELATED APPLICATION

This application claims the benefit of U.S. Provisional Application No. 62/479,331, filed on Mar. 31, 2017 and entitled "Camera with Panoramic Image and Depth Information and Depth Capturing Device and System," and the benefit of U.S. Provisional Application No. 62/549,967, filed on Aug. 25, 2017 and entitled "System of depth occlusion correction and method thereof," the contents of which are incorporated herein by reference.

BACKGROUND OF THE INVENTION

1. Field of the Invention

The present invention relates to a depth map generation device, and particularly to a depth map generation device capable of correcting occlusion.

2. Description of the Prior Art

When an object exists between a stereo camera and another object, a region of another object may be only shown on an image captured by a left eye image capturer (a right eye image capturer) of the stereo camera. That is, the right eye image capturer (the left eye image capturer) of the stereo camera cannot sense the region because of occlusion of the object. Therefore, when a depth map generator coupled to the stereo camera utilizes a triangulation algorithm provided by the prior art to generate a depth map corresponding to the another object, because the right eye image capturer (the left eye image capturer) cannot sense the region, the depth map will include an invalid area corresponding to the region, wherein an issue corresponding to the invalid area becomes worse with increase of a baseline between the left eye image capturer and the right eye image capturer. Therefore, how to design a depth map generation device capable of correcting occlusion will become an important issue.

SUMMARY OF THE INVENTION

An embodiment of the present invention provides a depth map generation device capable of correcting occlusion. The depth map generation device includes at least two image capture pairs and a depth map generator. The at least two image capture pairs are used for capturing a plurality of images. The depth map generator coupled to the at least two image capture pairs for generating a first depth map and a second depth map according to the plurality of images, wherein when the first depth map includes a first occlusion region and a first non-occlusion region, the depth map generator corrects the first occlusion region according to the second depth map.

An embodiment of the present invention provides a depth map generation device capable of correcting occlusion. The depth map generation device includes an image capture module and a depth map generator. The image capture module includes at least two image capture pairs, and each image capture pair of the at least two image capture pairs is composed of two image capturers, or an image capturer and a light source. The depth map generator is coupled to the image capture module. When a first depth map of at least two depth maps generated by the depth map generator corresponding to the at least two image capture pairs includes an occlusion region and a non-occlusion region, the depth map generator utilizes a second depth map of the at least two depth maps to correct the occlusion region.

An embodiment of the present invention provides a depth map generation device capable of correcting occlusion. The depth map generation device includes at least two image capture pairs and a depth map generator. The at least two image capture pairs are used for capturing a plurality of images. The depth map generator is coupled to the at least two image capture pairs for generating a first depth map and a second depth map according to the plurality of images, wherein the depth map generator further executes at least one of correcting an occlusion region of the first depth map according to the second depth map and fusing the first depth map and the second depth map to generate a fused depth map.

An embodiment of the present invention provides a depth map generation device capable of correcting occlusion. The depth map generation device includes two image capture pair groups and a depth map generator. The two image capture pair groups are used for capturing a plurality of first images and a plurality of second images, respectively. The depth map generator is coupled to two image capture pair groups for generating a plurality of first depth maps and a plurality of second depth maps according to the plurality of first images and the plurality of second images respectively, and fusing the plurality of first depth maps and the plurality of second depth maps to generate a first fused depth map and a second fused depth map, respectively. When the first depth map includes a first occlusion region and a first non-occlusion region, the depth map generator further corrects the first occlusion region according to the second fused depth map.

The present invention provides a depth map generation device capable of correcting occlusion. The depth map generation device utilizes a corresponding valid area of a second depth map of at least two depth maps corresponding to at least two image capture pairs generated by the depth map generator to correct (or substitute for) at least one occlusion region included in a first depth map of the at least two depth maps when the first depth map includes the at least one occlusion region. Therefore, compared to the prior art, because the present invention utilizes the corresponding valid area to correct (or substitute for) the at least one occlusion region, the present invention can effectively solve a problem of a depth map including an occlusion region.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
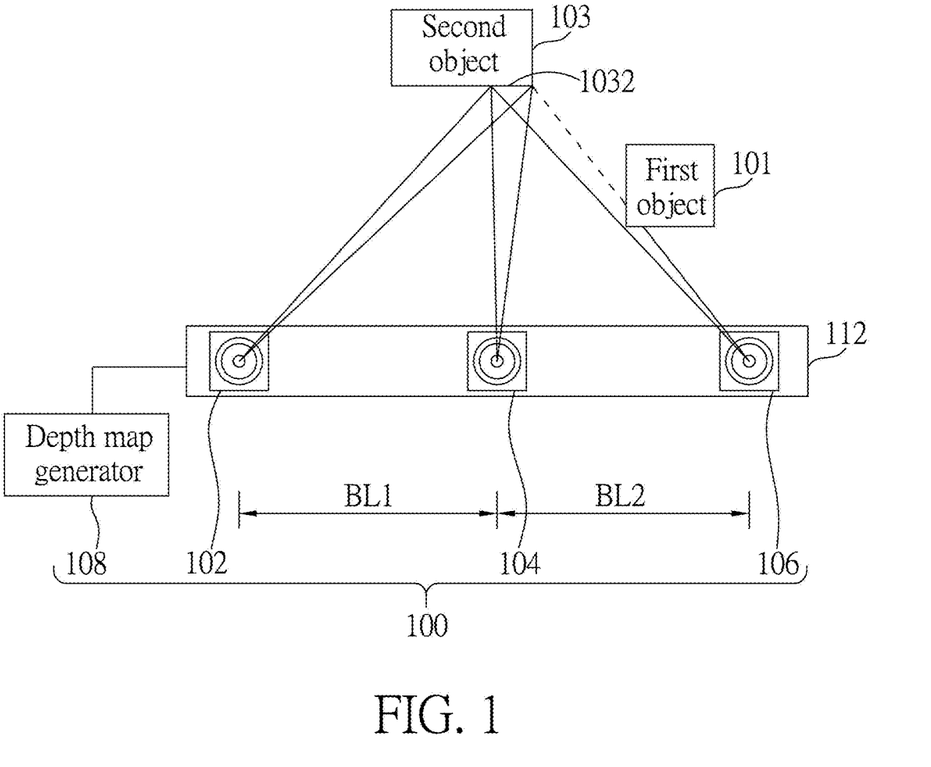
FIG. 1 is a diagram illustrating a depth map generation device capable of correcting occlusion according to a first embodiment of the present invention.

Please refer to FIG. 1. FIG. 1 is a diagram illustrating a depth map generation device 100 capable of correcting occlusion according to a first embodiment of the present invention, wherein the depth map generation device 100 includes image capturers 102, 104, 106 and a depth map generator 108, and the depth map generator 108 is coupled to the image capturers 102, 104, 106. But, the present invention is not limited to the depth map generation device 100 only including the image capturers 102, 104, 106, that is, the depth map generation device 100 can include more than three image capturers. As shown in FIG. 1, a first baseline BL1 exists between the image capturer 102 and the image capturer 104, and a second baseline BL2 exists between the image capturer 104 and the image capturer 106, wherein the image capturers 102, 104, 106 and the depth map generator 108 are installed on a printed circuit board 112. But, for simplifying FIG. 1, only the image capturers 102, 104, 106 are shown on the printed circuit board 112. In addition, in one embodiment of the present invention, a length of the first baseline BL1 is equal to a length of the second baseline BL2.

Figure 2A:
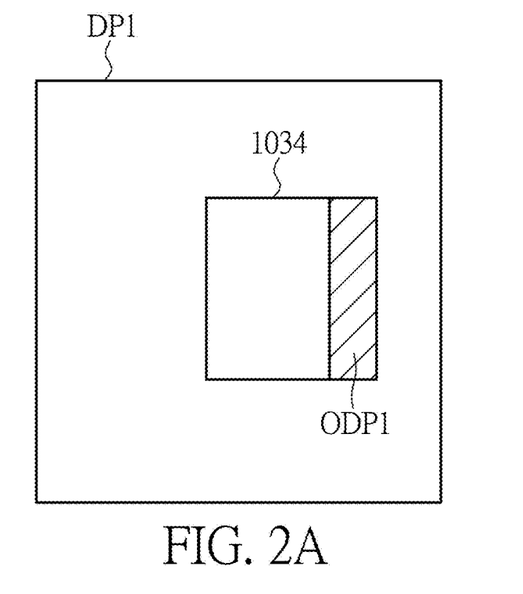
FIG. 2A is a diagram illustrating a region of a depth map corresponding to an object including an occlusion region.
Figure 2B:
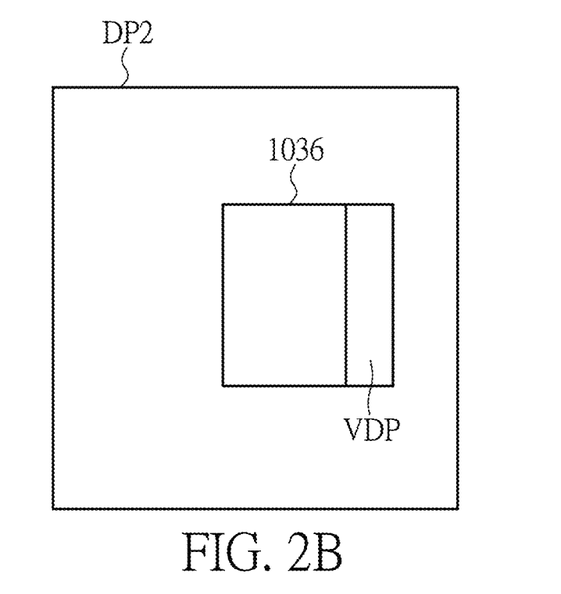
FIG. 2B is a diagram illustrating a region of a depth map corresponding to an occlusion region of another depth map.

The image capturers 102, 104, 106 form two image capture pairs, wherein the image capturers 102, 104 act as a first image capture pair, the image capturers 106, 104 act as a second image capture pair, and both the first image capture pair and the second image capture pair include the image capturer 104. As shown in FIG. 1, the depth map generator 108 is electrically connected to the image capturers 102, 104, 106 for generating a depth map corresponding to each image capture pair of the first image capture pair and the second image capture pair according to images captured by the each image capture pair. As shown in FIG. 1, when a first object 101 exists between the depth map generation device 100 and a second object 103, the image capturer 106 will not sense a region 1032 of the second object 103 because a visual field of the image capturer 106 corresponding to the second object 103 is occluded by the first object 101, resulting in a right side of a region 1034 of a depth map DP1 (corresponding to the second object 103) generated by the depth map generator 108 according to images captured by the second image capture pair including the second object 103 including an occlusion region ODP1 (as shown in FIG. 2A). As shown in FIG. 1, taking the image capturer 104 being installed on a left of the image capturer 106 and the image capturer 104 being installed on a right of the image capturer 102 as an example, a search direction of the depth map generator 108 within images captured by the image capturer 106 is toward left based on images captured by the image capturer 104, wherein the occlusion region ODP1 of the depth map DP1 is an invalid area of the depth map DP1. In addition, the depth map generator 108 can also generate a depth map DP2 corresponding to the first image capture pair according to images captured by the first image capture pair including the second object 103, wherein the depth map DP2 has a region 1036 corresponding to the object 103, and the search direction of the depth map generator 108 within images captured by the image capturer 102 is toward right. As shown in FIG. 1, although the first object 101 exists between the depth map generation device 100 and the second object 103, because visual fields of the image capturers 104, 102 corresponding to the second object 103 are not occluded by the first object 101, both the image capturers 104, 102 can sense the region 1032 of the second object 103. Therefore, based on the images captured by the image capturer 104, the search direction of the depth map generator 108 within the images captured by the image capturer 102 is toward right to generate the depth map DP2, so a region VDP (as shown in FIG. 2B) of the depth map DP2 corresponding to the occlusion region ODP1 of the depth map DP1 is a valid area. Therefore, the depth map generator 108 can utilize depth information of the region VDP of the depth map DP2 corresponding to the occlusion region ODP1 of the depth map DP1 to correct (e.g. substitute for) the occlusion region ODP1 of the depth map DP1, and then output a corrected depth map corresponding to the depth map DP1. But, in another embodiment of the present invention, the occlusion region ODP1 of the depth map DP1 and a predetermined contiguous area within the depth map DP1 adjacent to the occlusion region ODP1 are replaced with a corresponding valid area of the depth map DP2 to prevent the depth map generator 108 from not effectively correcting the occlusion region ODP1 of the depth map DP1 because an error of the occlusion region ODP1 of the depth map DP1, wherein a range of the predetermined contiguous area can be adjusted by a user. In addition, because the length of the first baseline BL1 is equal to the length of the second baseline BL2, so the depth map generator 108 can directly utilize the depth information of the region VDP of the depth map DP2 to substitute for the occlusion region ODP1 of the depth map DP1. That is, when the depth map generator 108 utilizes the depth information of the region VDP of the depth map DP2 to substitute for the occlusion region ODP1 of the depth map DP1, any normalization is not executed on a disparity of the region VDP to make the disparity of the region VDP match a disparity of the depth map DP1.

However, in another embodiment of the present invention, if the length of the first baseline BL1 is not equal to the length of the second baseline BL2, when the depth map generator 108 utilizes the depth information of the region VDP of the depth map DP2 to substitute for the occlusion region ODP1 of the depth map DP1, normalization needs to be executed on the disparity of the region VDP, that is, the disparity of the region VDP needs to be multiplied by a normalization ratio to match the disparity of the depth map DP1, wherein the normalization ratio is determined by equation (1):

$$NRA = BL2/BL1 \qquad (1)$$

As shown in equation (1), NRA is the normalization ratio, BL1 is the length of the first baseline, and BL2 is the length of the second baseline. Therefore, when the depth map generator 108 utilizes the depth information of the region VDP of the depth map DP2 to substitute for the occlusion region ODP1 of the depth map DP1, the disparity of the region VDP is a normalized disparity. In addition, in another embodiment of the present invention, when the depth map DP1 and the depth map DP2 are represented by distance, because a unit of the distance utilized in the depth map DP1 and the depth map DP2 is identical (e.g. meter), any normalization conversion is not executed on the depth map DP2 to make the depth map DP2 match the depth map DP1.

Figure 3:
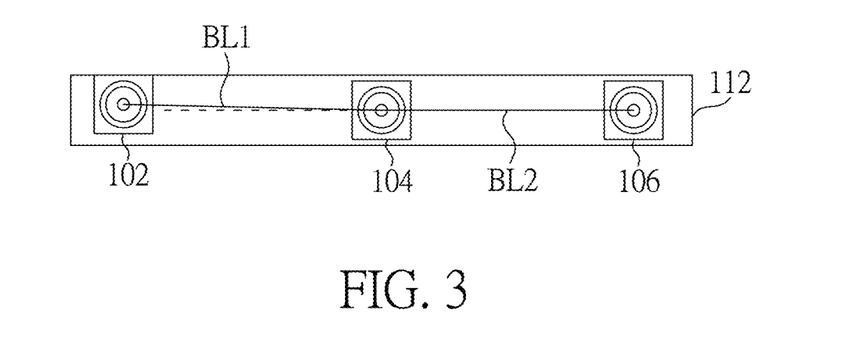
FIG. 3 is a diagram illustrating the first baseline and the second baseline not parallel to each other.

In addition, when the first baseline BL1 and the second baseline BL2 are not parallel to each other (as shown in FIG. 3), the depth map generator 108 further executes geometric calibration (e.g. rotation calibration) on at least one of the depth map DP1 and the depth map DP2. That is, the depth map generator 108 can utilize a first rotation matrix to rotate the depth map DP1, or utilize a second rotation matrix to rotate the depth map DP2, or utilize the first rotation matrix and the second rotation matrix to rotate the depth maps DP1, DP2 respectively, wherein the first rotation matrix and the second rotation matrix are obtained according to one of the first baseline BL1 and the second baseline BL2, or according to a reference line different from the first baseline BL1 and the second baseline BL2, and the first rotation matrix and the second rotation matrix are used for making the first baseline BL1 parallel to the second baseline BL2 after the depth map generator 108 executes the geometric calibration on at least one of the depth map DP1 and the depth map DP2.

Figure 4:
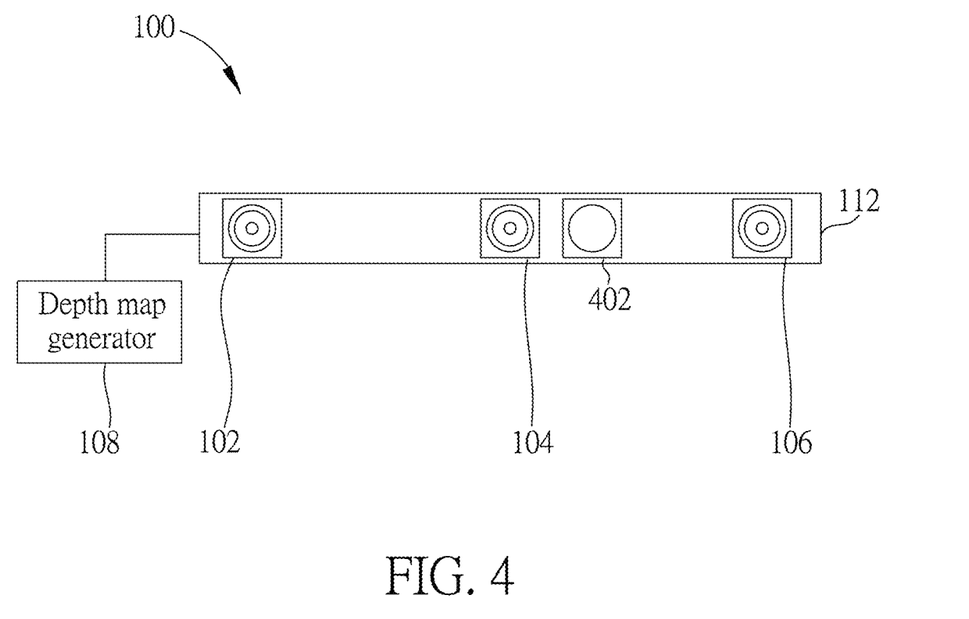
FIG. 4 is a diagram illustrating a depth map generation device capable of correcting occlusion according to another embodiment of the present invention.
Figure 5:
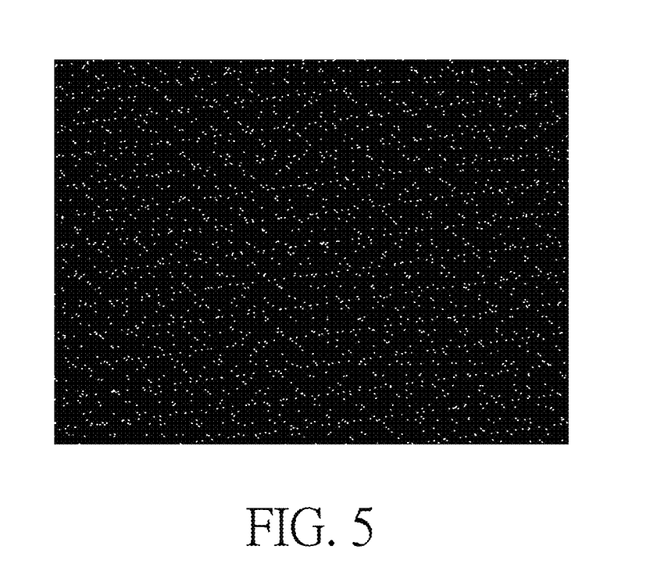
FIG. 5 is a diagram illustrating the structured light being a coding pattern.

In addition, in another embodiment of the present invention, the depth map generation device 100 can include at least one light source (e.g. alight source 402 shown in FIG. 4), wherein the at least one light source is used for emitting at least one structured light. As shown in FIG. 4, the light source 402 is an infrared light source for emitting structured light (or a random pattern), and the light source 402 is used for making better quality of the depth maps DP1, DP2 generated by the depth map generation device 100, wherein as shown in FIG. 5, the structured light is a coding pattern (corresponding to a random pattern). But, the present invention is not limited to light source 402 being an infrared light source. That is, the light source 402 can be other type of light sources (e.g. the light source 402 can be a visible light source). Or, in another embodiment of the present invention, the depth map generation device 100 can also include at least one infrared laser light source. Taking the depth map generation device 100 as an example, the light source 402 is turned on according to at least one of luminance of an environment which the depth map generation device 100 is located at, the quality of the depth map DP1 (or the depth map DP2, and a difference of the depth map DP1 (or the depth map DP2) corresponding to turning-on and turning-off of the light source 402.

When the light source 402 is turned on according to the luminance of the environment which the depth map generation device 100 is located at, a controller (not shown in FIG. 4) can determine the luminance of the environment which the depth map generation device 100 is located at according to at least one of a shutter time, an exposure time, and an ISO gain currently set by the image capturer 102 (or the image capturer 104, or the image capturer 106). Taking the exposure time as an example, in one embodiment of the present invention, when the shutter time of the image capturer 102 is fixed (or the image capturer 102 has no shutter), the controller can determine whether to turn on the light source 402 according to a value GEX generated by equation (2):

$$GEX = gain * EXPT \quad (2)$$

As shown in equation (2), "gain" shown in equation (2) is the ISO gain corresponding to the image capturer 102 and "EXPT" shown in equation (2) is the exposure time corresponding to the image capturer 102. When the value GEX is greater than a high threshold value, it means that the luminance of the environment which the depth map generation device 100 is located at is too dark, so the controller turns on the light source 402; and when the value GEX is less than a low threshold value, it means that the luminance of the environment which the depth map generation device 100 is located at is bright enough, so the controller turns off the light source 402, wherein the high threshold value is greater than the low threshold value. In addition, when a maximum value of the value GEX (corresponding to a maximum exposure time and a maximum gain of the image capturer 102) cannot be always greater than the high threshold value, the controller can turn on the light source 402 according to current luminance of the environment which the depth map generation device 100 is located at.

When the light source 402 is turned on according to the quality of the depth map DP1, the controller can determine the quality of the depth map DP1 according to at least one of a number of pixels with invalid values within the depth map DP1 and smoothness of the depth map DP1. For example, in one embodiment of the present invention, the controller can determine whether to turn on the light source 402 according to a value COST generated by equation (3):

$$COST = a * mean(HPF(x)) + b * invalid\_cnt(x) \quad (3)$$

As shown in equation (3), "HPF(x)" shown in equation (3) corresponds to a response of a high pass filter (because the smoothness of the depth map DP1 corresponds to high frequency areas of the depth map DP1), "mean(HPF(x))" shown in equation (3) corresponds to an average of the response of the high pass filter (but, in another embodiment of the present invention, "mean(HPF(x))" shown in equation (3) can be replaced with a sum corresponding to the response of the high pass filter), "invalid_cnt(x)" shown in equation (3) represents the number of the pixels of with the invalid values, "x" shown in equation (3) represents the depth map DP1, and "a, b" shown in equation (3) are coefficients. When the value COST is greater than a threshold value, it means that the luminance of the environment which the depth map generation device 100 is located at is too dark or shot objects of the depth map DP1 have no texture, so the controller turns on the light source 402. In addition, after the light source 402 is turned on for a predetermined time, the controller can attempt to turn off the light source 402 and make the image capturer 102 capture at least one image, and then the controller calculates a cost value corresponding to the at least one image according to equation (3). If the cost value corresponding to the at least one image is still greater than the threshold value, the controller turns on the light source 402 again and executes the above mentioned operation again after the controller turns on the light source 402 for the predetermined time; and if the cost value corresponding to the at least one image is less than the threshold value, the controller turns off the light source 402 until the cost value corresponding to the at least one image is greater than the threshold value again.

In addition, the controller can turn on and turn off the light source 402, and determine the quality of the depth map DP1 according to the difference of the depth map DP1 corresponding to turning-on and turning-off of the light source 402. If the difference of the depth map DP1 corresponding to turning-on and turning-off of the light source 402 is less than a reference value, it means that turning-on and turning-off of the light source 402 does not influence the quality of the depth map DP1, so the controller can turn off the light source 402.

In addition, after the light source 402 is turned on, the controller can optionally adjust intensity of the light source 402 according to luminance corresponding to a plurality of images captured by the image capturers 102, 104 and a target value, wherein the target value is set according to reflection coefficient of a human skin of the user corresponding to the structured light emitted by the light source 402. For example, the controller can generate a luminance distribution map corresponding to the plurality of images according to the plurality of images, and optionally adjust the intensity of the light source 402 according to a percentage of the depth map DP1 occupied by an area corresponding to a maximum luminance value of at least one luminance value within the luminance distribution map greater than the target value. In addition, in another embodiment of the present invention, the controller can generate average luminance corresponding to the plurality of images according to the plurality of images, and optionally adjust the intensity of the light source 402 according to the average luminance and the target value. In addition, in another embodiment of the present invention, the controller can generate a luminance histogram corresponding to a plurality of pixels of the plurality of images according to the plurality of images, and optionally adjust the intensity of the light source 402 according to a median of the luminance histogram and the target value, or according to a quartile of the luminance histogram and the target value.

In addition, in another embodiment of the present invention, after the light source 402 is turned on, the controller can optionally dynamically adjust the intensity of the light source 402 according to a distance between at least one predetermined object within the plurality of images and the image capturer 102 (or the image capturer 104, or the image capturer 106) and a first lookup table, wherein the first lookup table stores relationships between a distance corresponding to an object and the intensity of the light source 402. In addition, in another embodiment of the present invention, the controller can optionally dynamically adjust the intensity of the light source 402 according to the distance between the at least one predetermined object within the plurality of images and the image capturer 102 (or the image capturer 104, or the image capturer 106) and a first correlation formula.

In addition, in another embodiment of the present invention, the controller continuously detects the luminance of the environment which the depth map generation device 100 is located at under the light source 402 being turned off. When the luminance of the environment is brighter, the controller increases the intensity of the light source 402 (when the light source 402 is turned on) according to a second lookup table, wherein the second lookup table stores relationships between the intensity of the light source 402 (when the light source 402 is turned on) and the luminance of the environment. In addition, in another embodiment of the present invention, when the luminance of the environment is brighter, the controller increases the intensity of the light source 402 (when the light source 402 is turned on) according to a second correlation formula.

In addition, in another embodiment of the present invention, after the controller first turns off the light source 402, the controller detects the luminance of the environment. Then, according to an automatic exposure (AE) algorithm well-known to one of ordinary skill in the art, the controller utilizes the exposure time (or at least one of the shutter time, the exposure time, and the ISO gain) of the image capturer 102 (or the image capturer 104, or the image capturer 106) to make the luminance of the environment be reduced to not to interfere with the image capturer 102 (or the image capturer 104, or the image capturer 106), and fixes a current exposure time of the image capturer 102 (or the image capturer 104, or the image capturer 106). Then, the controller turns on the light source 402 and detects the intensity of the light source 402 until the intensity of the light source 402 is up to the target value.

Figure 6:
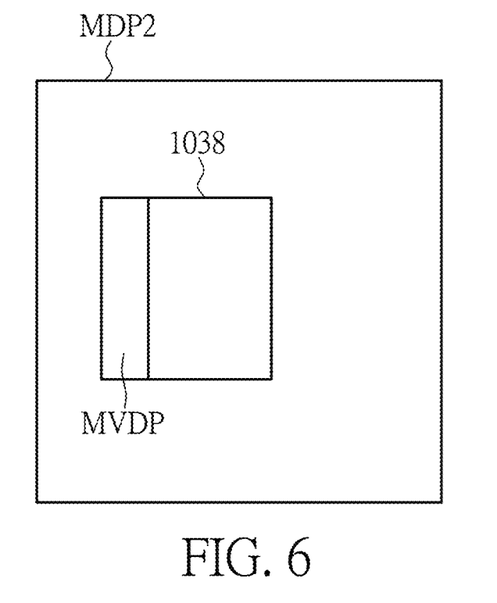
FIG. 6 is a diagram illustrating the depth map generator generating a mirror depth map.

In addition, in another embodiment of the present invention, a depth map can also be generated by the depth map generator 108 searching the same direction. For the second image capture pair, based on the images captured by the image capturer 104, the search direction of the depth map generator 108 within the images captured by the image capturer 106 is still toward left to generate the depth map DP1 (as shown in FIG. 2A); for the first image capture pair, the depth map generator 108 first mirrors the images captured by the image capturers 102, 104. Then, based on mirror images corresponding to the image capturer 104, the search direction of the depth map generator 108 within mirror images corresponding to the image capturer 102 is toward left to generate a mirror depth map MDP2 (as shown in FIG. 6), wherein the mirror depth map MDP2 also include a region 1038 corresponding to the object 103, and the mirror depth map MDP2 also include a mirror valid region MVDP corresponding to the occlusion region ODP1 of the depth map DP1. Before the occlusion region ODP1 is corrected, for making coordinates of the mirror depth map MDP2 match coordinates of the depth map DP1 corresponding to the object 103, the depth map generator 108 first needs to mirror the mirror depth map MDP2 to generate the depth map DP2 (as shown in FIG. 2B), and then can utilize the depth information of the region VDP of the depth map DP2 to substitute for the occlusion region ODP1 of the depth map DP1.

In addition, the depth map generator 108 can be a field programmable gate array (FPGA) with the above mentioned functions of the depth map generator 108, or an application-specific integrated circuit (ASIC) with the above mentioned functions of the depth map generator 108, or a software module with the above mentioned functions of the depth map generator 108.

In addition, in another embodiment of the present invention, if the visual field of the image capturer 102 of the first image capture pair (composed of the image capturers 102, 104) corresponding to an object is occluded by a first object, depth information of a first depth map generated by the first image capture pair corresponding to the object will include a first occlusion region and a first non-occlusion region, and depth information of the first occlusion region is an invalid area of the first depth map; if the visual field of the image capturer 106 of the second image capture pair (composed of the image capturers 104, 106) corresponding to the object is occluded by a second object, depth information of the second depth map generated by the second image capture pair corresponding to the object will include a second occlusion region and a second non-occlusion region, and depth information of the second occlusion region is an invalid area of the second depth map. Therefore, when the first non-occlusion region is a valid area of the first depth map corresponding to the second occlusion region and the second non-occlusion region is a valid area of the second depth map corresponding to the first occlusion region, the depth map generator 108 can correct (e.g. substitute for) the second occlusion region and the first occlusion region according to the first non-occlusion region and the second non-occlusion region, respectively.

Figure 7:
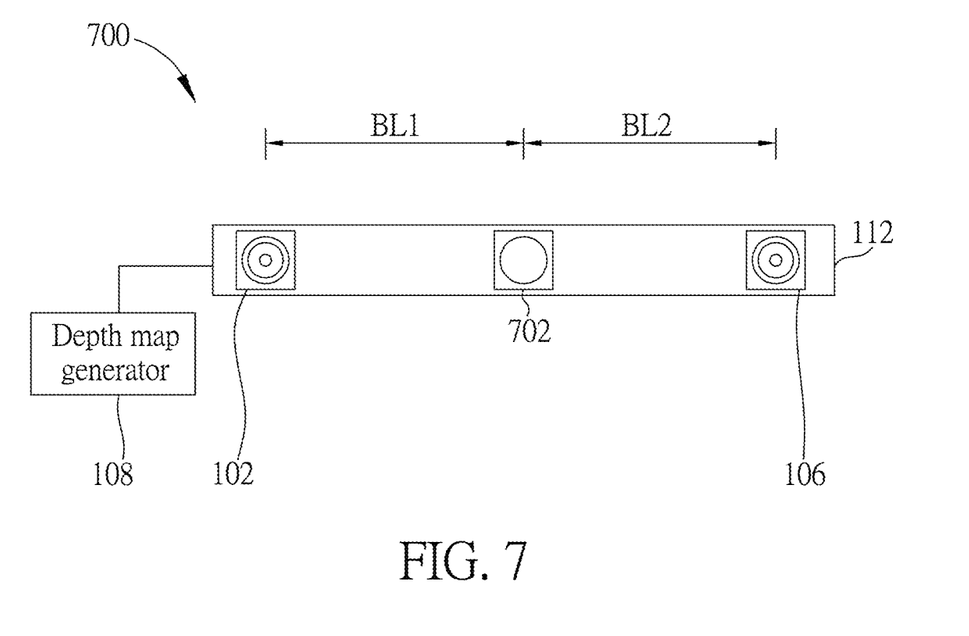
FIG. 7 is a diagram illustrating a depth map generation device capable of correcting occlusion according to a second embodiment of the present invention.

In addition, please refer to FIG. 7. FIG. 7 is a diagram illustrating a depth map generation device 700 capable of correcting occlusion according to a second embodiment of the present invention, wherein the depth map generation device 700 includes image capturers 102, 106, a light source 702, and a depth map generator 108. But, the present invention is not limited to the depth map generation device 700 only including the image capturers 102, 106. That is, the depth map generation device 700 can also include more than three image capturers. In addition, the light source 702 and the image capturer 102 form a first image capture pair, and the light source 702 and the image capturer 106 form a second image capture pair. As shown in FIG. 7, a first baseline BL1 exists between the light source 702 and the image capturer 102, and a second baseline BL2 exists between the light source 702 and the image capturer 106. The depth map generator 108 is electrically connected to the image capturers 102, 106 for generating a depth map corresponding to each image capture pair of the first image capture pair and the second image capture pair according to an image including the structured light captured by the each image capture pair. That is, the depth map generator 108 will generate two depth maps corresponding to the first image capture pair and the second image capture pair. Therefore, when a first depth map corresponding to the first image capture pair includes an occlusion region and a second depth map corresponding to the second image capture pair does not include any occlusion region, or when an occlusion region included in the first depth map corresponding to the first image capture pair and an occlusion region included in the second depth map corresponding to the second image capture pair correspond to different regions, the depth map generator 108 of the depth map generation device 700 can utilize the above-mentioned operational principles of the depth map generator 108 of the depth map generation device 100 to correct the occlusion region included in the first depth map corresponding to the first image capture pair and the occlusion region included in the second depth map corresponding to the second image capture pair, so further description thereof is omitted for simplicity. In addition, operational principles of the light source 702 can also be referred to operational principles of the light source 402, so further description thereof is also omitted for simplicity.

Figure 8:
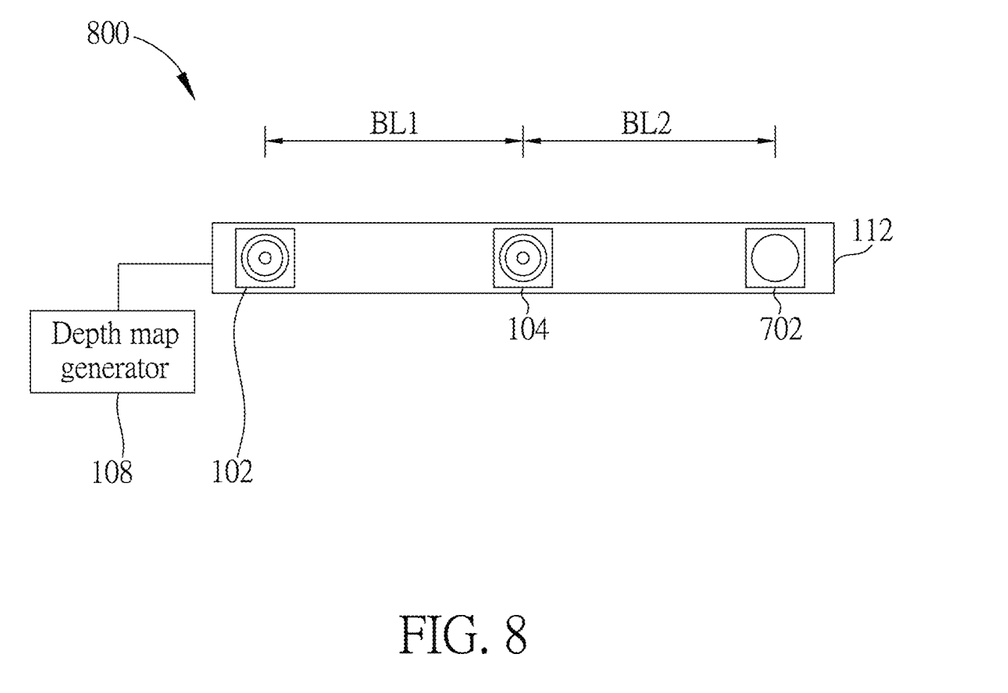
FIG. 8 is a diagram illustrating a depth map generation device capable of correcting occlusion according to a third embodiment of the present invention.

In addition, please refer to FIG. 8. FIG. 8 is a diagram illustrating a depth map generation device 800 capable of correcting occlusion according to a third embodiment of the present invention, wherein the depth map generation device 800 includes image capturers 102, 104, a light source 702, and a depth map generator 108. But, the present invention is not limited to the depth map generation device 800 only including the two image capturers 102, 104. That is, the depth map generation device 800 can include more than three image capturers. In addition, the image capturers 102, 104 form a first image capture pair and the light source 702 and the image capturer 104 form a second image capture pair. As shown in FIG. 8, a first baseline BL1 exists between the image capturers 102, 104, and a second baseline BL2 exists between the light source 702 and the image capturer 104. As shown in FIG. 8, the depth map generator 108 is electrically connected to the image capturers 102, 104 for generating two depth maps corresponding to the first image capture pair and the second image capture pair according to images captured by the first image capture pair and images including the structured light captured by the second image capture pair. Therefore, the depth map generator 108 of the depth map generation device 800 can utilize the above-mentioned operational principles of the depth map generator 108 of the depth map generation device 100 to correct a depth map with an occlusion region, so further description thereof is omitted for simplicity.

Figure 9:
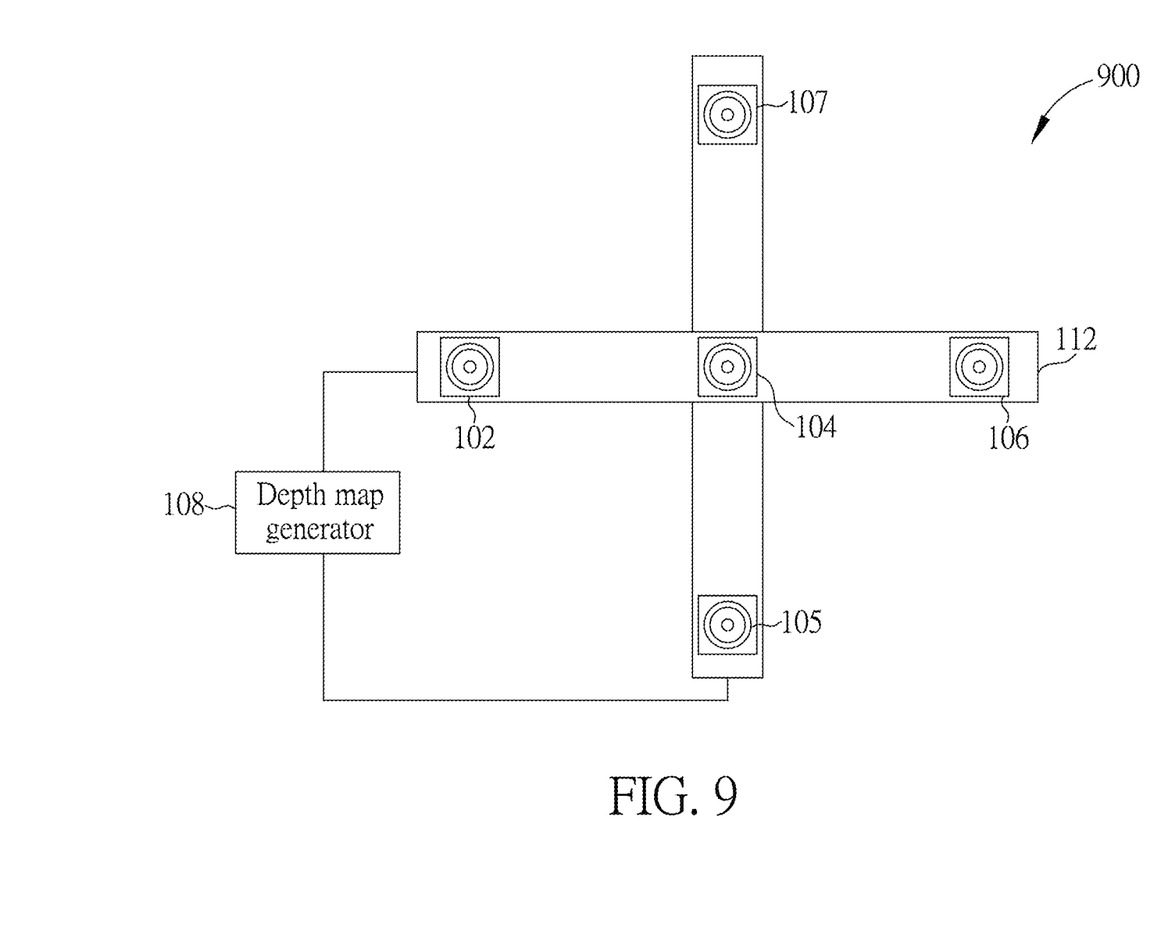
FIG. 9 is a diagram illustrating a depth map generation device capable of correcting occlusion according to a fourth embodiment of the present invention.

In addition, please refer to FIG. 9. FIG. 9 is a diagram illustrating a depth map generation device 900 capable of correcting occlusion according to a fourth embodiment of the present invention, wherein the depth map generation device 900 includes image capturers 102, 104, 105, 106, 107 and a depth map generator 108. But, the present invention is not limited to the depth map generation device 900 only including the image capturers 102, 104, 105, 106, 107. As shown in FIG. 9, the image capturers 104, 106 form a first image capture pair, the image capturers 104, 107 form a second image capture pair, the image capturers 104, 102 form a third image capture pair, and the image capturers 104, 105 form a fourth image capture pair, and the fourth embodiment of the present invention is based on the first image capture pair. Therefore, if a first depth map corresponding to the first image capture pair includes an occlusion region and a second depth map corresponding to the second image capture pair does not include any occlusion region, the depth map generator 108 first needs to execute the geometric calibration on the second depth map based on the first image capture pair. That is, the second image capture pair will first be geometrically converted to a condition which can make the depth map generator 108 generate the second depth map. After the depth map generator 108 generates the second depth map, the depth map generator 108 will rotate the second depth map (e.g. rotate the second depth map 90 degree) to make a baseline corresponding to the second image capture pair parallel to a baseline corresponding to the first image capture pair. Similarly, if the first depth map includes the occlusion region and a third depth map corresponding to the third image capture pair does not include any occlusion region, the depth map generator 108 first needs to execute the geometric calibration on the third depth map based on the first image capture pair. That is, the third image capture pair will first be geometrically converted to a condition which can make the depth map generator 108 generate the third depth map. After the depth map generator 108 generates the third depth map, the depth map generator 108 will rotate the third depth map (e.g. rotate the third depth map 180 degree) to make a baseline corresponding to the third image capture pair parallel to a baseline corresponding to the first image capture pair. But, in another embodiment of the present invention, the depth map generator 108 can also first mirror the third depth map to achieve an effect of the geometric calibration, wherein operational principles of the depth map generator 108 mirroring the third depth map can be referred to the embodiment shown in FIG. 6, so further description thereof is omitted for simplicity. In addition, operational principles of the fourth image capture pair can be referred to the above-mentioned operational principles of the second image capture pair, so further description thereof is omitted for simplicity. In addition, after the depth map generator 108 of the depth map generation device 900 executes the geometric calibration, subsequent operational principles of the depth map generator 108 of the depth map generation device 900 can be referred to the operational principles of the depth map generator 108 of the depth map generation device 100, so further description thereof is omitted for simplicity.

Figure 10:
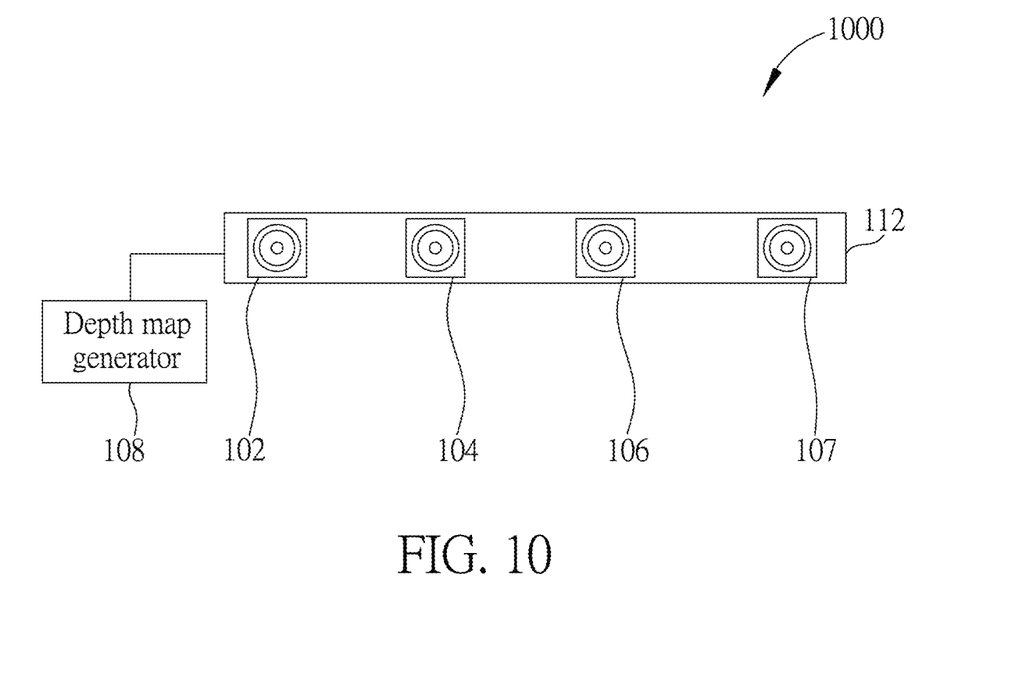
FIG. 10 is a diagram illustrating a depth map generation device capable of correcting occlusion according to a fifth embodiment of the present invention.

In addition, please refer to FIG. 10. FIG. 10 is a diagram illustrating a depth map generation device 1000 capable of correcting occlusion according to a fifth embodiment of the present invention, wherein the depth map generation device 1000 includes image capturers 102, 104, 106, 107 and a depth map generator 108. But, the present invention is not limited to the depth map generation device 1000 only including the image capturers 102, 104, 106, 107. As shown in FIG. 10, the image capturers 104, 102 form a first image capture pair, the image capturers 104, 106 form a second image capture pair, and the image capturers 104, 107 form a third image capture pair. Therefore, when a first depth map corresponding to the first image capture pair includes an occlusion region and a second depth map corresponding to the second image capture pair does not include any occlusion region, the depth map generator 108 of the depth map generation device 1000 can utilize the above-mentioned operational principles of the depth map generator 108 of the depth map generation device 100 to correct the occlusion region. In addition, as shown in FIG. 10, the depth map generator 108 can further fuse the second depth map corresponding to the second image capture pair and a third depth map corresponding to the third image capture pair to generate a fused depth map, wherein the second depth map and the third depth map have different characteristics. For example, because a length of a baseline of the second image capture pair is not equal to a length of a baseline of the third image capture pair, a working range of the second depth map corresponding to the second image capture pair is also not equal to a working range of the third depth map corresponding to the third image capture pair. Therefore, the depth map generator 108 can fuse the working range of the second depth map corresponding to the second image capture pair and the working range of the third depth map corresponding to the third image capture pair to generate the fused depth map.

Figure 11:
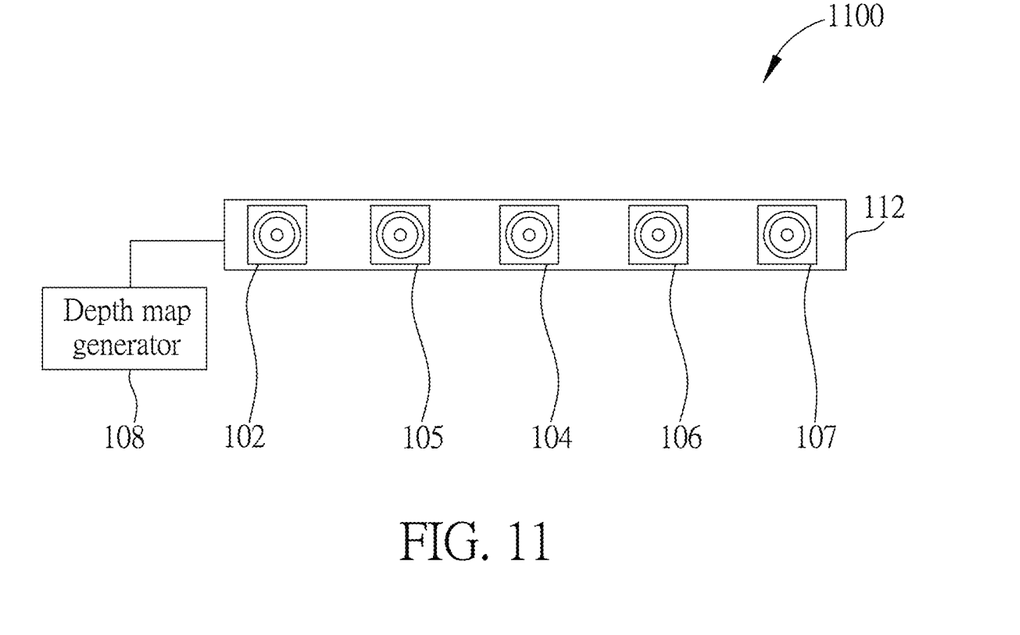
FIG. 11 is a diagram illustrating a depth map generation device capable of correcting occlusion according to a sixth embodiment of the present invention.

In addition, please refer to FIG. 11. FIG. 11 is a diagram illustrating a depth map generation device 1100 capable of correcting occlusion according to a sixth embodiment of the present invention, wherein the depth map generation device 1000 includes image capturers 102, 104, 105, 106, 107 and a depth map generator 108. But, the present invention is not limited to the depth map generation device 1100 only including the image capturers 102, 104, 105, 106, 107. As shown in FIG. 11, the image capturers 104, 102 form a first image capture pair, the image capturers 104, 105 form a second image capture pair, the image capturers 104, 106 form a third image capture pair, and the image capturers 104, 107 form a fourth image capture pair, wherein the first image capture pair and the second image capture pair belong to a first image capture pair group, and the third image capture pair and the fourth image capture pair belong to a second image capture pair group. In sixth embodiment of the present invention, the depth map generator 108 can first fuse depth maps corresponding to the first image capture pair group to generate a first fused depth map, and fuse depth maps corresponding to the second image capture pair group to generate a second fused depth map, wherein quality of the first fused depth map is better than quality of a first depth map corresponding to the first image capture pair and quality of a second depth map corresponding to the second image capture pair, and quality of the second fused depth map is better than quality of a third depth map corresponding to the third image capture pair and quality of a fourth depth map corresponding to the fourth image capture pair. If the first fused depth map includes a first occlusion region and a first non-occlusion region, the depth map generator 108 can utilize depth information of a valid area of the second fused depth map corresponding to the first occlusion region to correct the first occlusion region according to the above-mentioned operational principles of the depth map generator 108 of the depth map generation device 100.

To sum up, the depth map generation device capable of correcting occlusion utilizes a corresponding valid area of a second depth map of at least two depth maps corresponding to at least two image capture pairs generated by the depth map generator to correct (or substitute for) at least one occlusion region included in a first depth map of the at least two depth maps when the first depth map includes the at least one occlusion region. Therefore, compared to the prior art, because the present invention utilizes an image capturer of the second image capture pair, wherein a visual field of the image capturer is not occluded, to obtain depth information of an object, the present invention can effectively solve a problem of a depth map including an occlusion region.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A depth map generation device capable of correcting occlusion, comprising:
   a first image capture pair and a second image capture pair capturing a plurality of images; and
   a depth map generator coupled to the first image capture pair and the second image capture pair for generating a first depth map and a second depth map according to the plurality of images, wherein the first depth map corresponds to the first image capture pair and the second depth map corresponds to the second image capture pair, and when the first depth map comprises a first occlusion region and a first non-occlusion region, wherein the depth map generator utilizes a corresponding valid area of the second depth map to substitute for the first occlusion region to eliminate an occlusion effect on the first depth map, and both the first occlusion region and the corresponding valid area comprise an object.

2. The depth map generation device of claim 1, wherein a first image capturer is comprised in both the first image capture pair and the second image capture pair.

3. The depth map generation device of claim 2, wherein a length of a first baseline of the first image capture pair is equal to a length of a second baseline of the second image capture pair.

4. The depth map generation device of claim 2, wherein when a length of a first baseline of the first image capture pair is not equal to a length of a second baseline of the second image capture pair, the depth map generator further executes normalization on the second depth map to make a disparity of the first depth map match a disparity of the second depth map.

5. The depth map generation device of claim 2, wherein when a first baseline of the first image capture pair and a second baseline of the second image capture pair are not parallel to each other, the depth map generator further executes geometric calibration on at least one of the first depth map and the second depth map.

6. The depth map generation device of claim 5, wherein the geometric calibration is rotation calibration.

7. The depth map generation device of claim 2, wherein a visual field of a second image capturer of the first image capture pair corresponding to the object is occluded by a first object to make depth information of the first depth map corresponding to the object comprise the first occlusion region and the first non-occlusion region, and the depth information of the first depth map corresponding to the first occlusion region is an invalid area; and a visual field of a third image capturer of the second image capture pair corresponding to the object is not occluded by the first object, and the depth map generator corrects the first occlusion region according to depth information of the second depth map corresponding to the object.

8. The depth map generation device of claim 2, wherein a visual field of a second image capturer of the first image capture pair corresponding to the object is occluded by a first object to make depth information of the first depth map corresponding to the object comprise the first occlusion region and the first non-occlusion region, and the depth information of the first depth map corresponding to the occlusion region is an invalid area; a visual field of a third image capturer of the second image capture pair corresponding to the object is occluded by a second object to make depth information of the second depth map corresponding to the object comprises a second occlusion region and a second non-occlusion region, and the depth information of the second depth map corresponding to the second occlusion region is an invalid area; and the depth map generator corrects the second occlusion region and the first occlusion region according to the first non-occlusion region and the second non-occlusion region, respectively.

9. The depth map generation device of claim 1, wherein each image capture pair of the first image capture pair and the second image capture pair is composed of two image capturers, or an image capturer and a light source.

10. The depth map generation device of claim 9, wherein the light source is used for emitting structured light.

11. A depth map generation device capable of correcting occlusion, comprising:
an image capture module comprising a first image capture pair and a second image capture pair, and each image capture pair of the first image capture pair and the second image capture pair is composed of two image capturers, or an image capturer and a light source; and
a depth map generator coupled to the image capture module to generate a first depth map and a second depth map, wherein the first depth map corresponds to the first image capture pair and the second depth map corresponds to the second image capture pair, and when the first depth map comprises an occlusion region and a non-occlusion region, the depth map generator utilizes a corresponding valid area of the second depth map to substitute for the occlusion region and a predetermined contiguous area within the first depth map adjacent to the occlusion region to eliminate an occlusion effect on the first depth map;
wherein both the occlusion region and the corresponding valid area comprise an object.

12. The depth map generation device of claim 11, wherein the light source is used for emitting structured light, and when at least one image capture pair of the first image capture pair and the second image capture pair is composed of the image capturer and the light source, the at least one image capture pair is used for capturing images comprising the structured light.

13. The depth map generation device of claim 11, wherein the occlusion region is an invalid area of the first depth map formed by the object being occluded by another object.

14. A depth map generation device capable of correcting occlusion, comprising:
a first image capture pair and a second image capture pair capturing a plurality of images; and
a depth map generator coupled to the first image capture pair and the second image capture pair for generating a first depth map and a second depth map according to the plurality of images, wherein the first depth map corresponds to the first image capture pair and the second depth map corresponds to the second image capture pair, and the depth map generator further executes at least one of correcting an occlusion region of the first depth map according to the second depth map and fusing the first depth map and the second depth map to generate a fused depth map, wherein when the depth map generator corrects the occlusion region, the depth map generator utilizes a corresponding valid area of the second depth map to substitute for the occlusion region to eliminate an occlusion effect on the first depth map;
wherein both the occlusion region and the corresponding valid area comprise an object.

15. A depth map generation device capable of correcting occlusion, comprising:
a first image capture pair group and a second image capture pair group capturing a plurality of first images and a plurality of second images, respectively; and
a depth map generator coupled to the first image capture pair group and the second image capture pair group for generating a plurality of first depth maps and a plurality of second depth maps according to the plurality of first images and the plurality of second images respectively, and fusing the plurality of first depth maps and the plurality of second depth maps to generate a first fused depth map and a second fused depth map, respectively;
wherein the plurality of first depth maps correspond to the first image capture pair group and the plurality of second depth maps correspond to the second image capture pair group, and when the first fused depth map comprises a first occlusion region and a first non-occlusion region, the depth map generator further utilizes a corresponding valid area of the second fused depth map to substitute for the first occlusion region to eliminate an occlusion effect on the first fused depth map;
wherein both the first occlusion region and the corresponding valid area comprise an object.

* * * * *